United States Patent
Zaykov et al.

(10) Patent No.: US 11,847,074 B2
(45) Date of Patent: Dec. 19, 2023

(54) INPUT/OUTPUT DEVICE OPERATIONAL MODES FOR A SYSTEM WITH MEMORY POOLS

(71) Applicant: Honeywell International Inc., Charlotte, NC (US)

(72) Inventors: Pavel Zaykov, Brno (CZ); Larry James Miller, Black Canyon City, AZ (US)

(73) Assignee: Honeywell International Inc., Charlotte, NC (US)

( * ) Notice: Subject to any disclaimer, the term of this patent is extended or adjusted under 35 U.S.C. 154(b) by 366 days.

(21) Appl. No.: 17/087,221

(22) Filed: Nov. 2, 2020

(65) Prior Publication Data

US 2022/0138131 A1  May 5, 2022

(51) Int. Cl.
*G06F 13/28* (2006.01)
*G06F 12/0806* (2016.01)
*G06F 13/16* (2006.01)

(52) U.S. Cl.
CPC .......... *G06F 13/28* (2013.01); *G06F 12/0806* (2013.01); *G06F 13/1668* (2013.01); *G06F 2212/6042* (2013.01); *G06F 2213/28* (2013.01)

(58) Field of Classification Search
CPC ....................................................... G06F 13/28
USPC .......................................................... 710/22
See application file for complete search history.

(56) References Cited

U.S. PATENT DOCUMENTS

| | | | |
|---|---|---|---|
| 6,370,622 B1 | 4/2002 | Chiou et al. | |
| 7,424,553 B1 | 9/2008 | Borrelli et al. | |
| 8,069,308 B2 | 11/2011 | Larson et al. | |
| 8,868,790 B2 | 10/2014 | Lovett et al. | |
| 9,812,221 B1 | 11/2017 | Hagen et al. | |
| 9,824,015 B2 | 11/2017 | Podaima et al. | |
| 2002/0078124 A1* | 6/2002 | Baylor | G06F 9/3851 718/107 |
| 2004/0205265 A1 | 10/2004 | Ling et al. | |
| 2004/0215882 A1* | 10/2004 | Alexander | G06F 12/0864 711/E12.063 |
| 2004/0243765 A1* | 12/2004 | Lee | G06F 12/0842 711/E12.039 |
| 2007/0067578 A1* | 3/2007 | Kurichiyath | G06F 12/0897 711/E12.043 |
| 2008/0168230 A1* | 7/2008 | Shen | G06F 12/121 711/E12.07 |

(Continued)

FOREIGN PATENT DOCUMENTS

| | | |
|---|---|---|
| EP | 2090987 A1 | 8/2009 |
| EP | 3367246 A1 | 8/2018 |

(Continued)

OTHER PUBLICATIONS

Kumar et al., "Impact of Cache Coherence Protocols on the Processing of Network Traffic", 40th IEEE/ACM International Symposium on Microarchitecture, Dec. 2007, pp. 161 through 171, IEEE Computer Society.
Xilinx, "Zynq UltraScale+ Device" Technical Reference Manual, UG1085 (v2.1), Aug. 21, 2019, pp. 1 through 1177, XILINX.
European Patent Office, "Extended European Search Report from EP Application No. 21205391.2", from Foreign Counterpart to U.S. Appl. No. 17/087,221, filed Apr. 5, 2022, pp. 1 through 13, Published: EP.

(Continued)

*Primary Examiner* — Titus Wong
(74) *Attorney, Agent, or Firm* — Fogg & Powers LLC

(57) ABSTRACT

Examples of computing systems that include input/output (I/O) devices that respect an existing hardware resource partitioning in a modern computing platform are provided.

20 Claims, 5 Drawing Sheets

(56) References Cited

U.S. PATENT DOCUMENTS

| | | | |
|---|---|---|---|
| 2009/0204764 A1* | 8/2009 | Larson | G06F 12/0893 |
| | | | 711/E12.016 |
| 2010/0268912 A1* | 10/2010 | Conte | G06F 9/5044 |
| | | | 712/20 |
| 2013/0047162 A1* | 2/2013 | Stefanov | G06F 9/5033 |
| | | | 718/102 |
| 2014/0173221 A1 | 6/2014 | Samih et al. | |
| 2015/0205724 A1* | 7/2015 | Hancock | G06F 12/1027 |
| | | | 711/129 |
| 2019/0179756 A1 | 6/2019 | Zaykov et al. | |

FOREIGN PATENT DOCUMENTS

| | | |
|---|---|---|
| EP | 3066568 B1 | 9/2019 |
| WO | 2008057833 A2 | 5/2008 |
| WO | 2008057833 A3 | 5/2008 |

OTHER PUBLICATIONS

Jain et al., "Fractional GPUs: Software-based Compute and Memory Bandwidth Reservation for GPUs", 2019 IEEE Real-Time and Embedded Technology and Applications Symposium (RTAS), Apr. 16, 2019, pp. 29 through 41, (c) 2019 IEEE.

Intel, "Intel Data Direct I/O Technology", at least as early as Oct. 1, 2020, pp. 1 through 3, https://www.intel.com/content/www/us/en/io/data-direct-i-o-technology.html.

Tang, "DMA Cache: Using On-Chip Storage to Archictecturally Separate I/O Data from CPU Data for Improving I/O Performance", 16th International Conference on High-Performance Computer Architecture (HPCA-16 2010), Jan. 2010, pp. 1 through 13, Bangalore, India.

\* cited by examiner

INPUT/OUTPUT DEVICE OPERATIONAL MODES FOR A SYSTEM WITH MEMORY POOLS

BACKGROUND

In a time-partitioned safety-critical system, safety-critical applications have to be properly time-budgeted such that the application execution time is sufficient to accommodate the execution of the designated application functionality. The time-budgeting of safety-critical applications is based on its worst-case time budgets and it is often referred to as Worst-Case Execution Time (WCET).

SUMMARY

In one example, a computing system includes at least one central processing unit, one or more central processing unit caches, and a main memory comprising a plurality of locations. Each location of the plurality of locations maps to a set in the one or more central processing unit caches. A first subset of locations of the plurality of locations are partitioned for one or more threads of a first application and assigned to non-contiguous memory locations of the main memory based on a respective set of one or more sets in the one or more central processing unit caches to which each location is mapped. The computing system further includes a first input/output (I/O) device configured to store data in a second subset of locations of the plurality of locations that are different from the first subset of locations partitioned for the one or more threads of the first application. The second subset of locations are non-contiguous memory locations of the main memory that are separated in address space according to a predefined pattern.

DRAWINGS

Understanding that the drawings depict only some embodiments and are not therefore to be considered limiting in scope, the exemplary embodiments will be described with additional specificity and detail using the accompanying drawings, in which.

Figure 1:
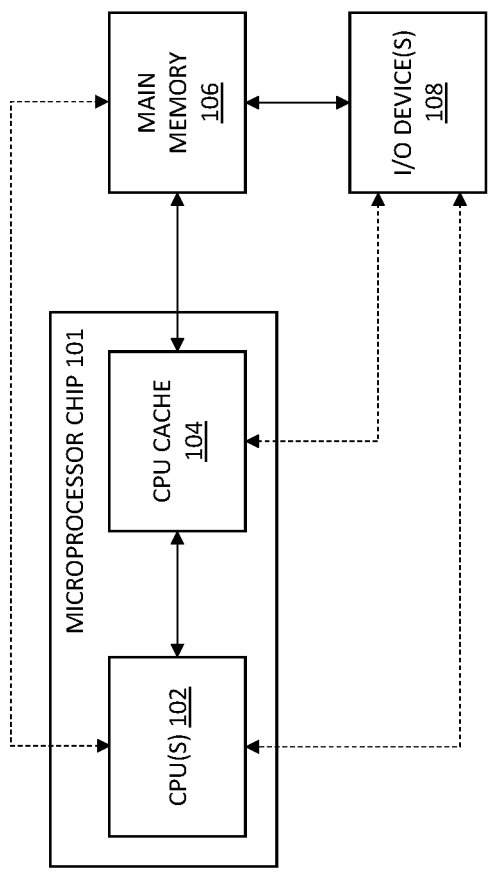
FIG. 1 is a block diagram of an example computing system.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Modern computing platforms in the avionics domain are characterized by their timing non-determinism because there might be multiple sources of memory interference (e.g., processor cores, Direct Memory Accesses (DMAs), graphics processing unit (GPU), and specialized co-processors). The timing non-determinism makes the application WCET difficult to determine. In a modern computing platform, the application WCET is often empirically measured by introducing cross-interference to the shared hardware resources. An example of a shared hardware resource can be for example the memory hierarchy—memory buses, caches, memory controllers, and DDR memory. One effective means to bound interference between applications and thus reduce its WCET is to partition/isolate by allocating a dedicated hardware shared resources to specific application(s). For example, to eliminate the cache interference, some systems, such as those described in U.S. Pat. No. 8,069,308 (hereinafter "the '308 patent") partition the cache by using of memory pools. The '308 patent is hereby incorporated herein by reference.

When using memory pools for threads of an application as described in the '308 patent, the memory allocated to each application is not contiguous. For example, one application may be allocated every 16th memory page, and the next application may be allocated the next page and every 16th memory page from that page. Each cache-unique set of pages is considered as a cache partition. Memory pools typically encompass one or more cache pools according to the cache and memory needs of the applications. The memory management unit (MMU) of the processor is configured to make any set of pages allocated to an application appear to be contiguous to the application, so the application sees a virtual address space that is contiguous even though the allocated underlying physical memory region is not contiguous.

It is desirable to enable applications, and the computing system generally, to interact with a file system and receive data from outside sources. Typically, input/output (I/O) devices (for example, DMA engines, GPUs, or co-processors) save data in the main memory using physically contiguous memory regions, which are only compatible with a computing system utilizing memory pools if these regions are uncached from the processor's perspective. This is because accesses to such regions by an application would pollute many or all of the memory pools by evicting data when reading or by leaving dirty data behind in pools in which the application has no quota. This is because these contiguous regions, if more than a page in size, will cut across the cache partitions allocated to each application. To avoid interference with the memory pools in the cache, these computing systems utilizing memory pools typically allocate shared I/O data to uncached memory regions even if the IO device is capable of snooping the CPU's cache. Accesses by CPU cores to uncached memory regions to read or write I/O data are much slower than to cached regions, so while necessary to protect the integrity of the cache partitioning, performance is impacted by this strategy.

The example systems and methods described herein enable a computing system using memory pools to interact with I/O devices that respect an existing CPU cache partitioning strategy. By using the techniques described herein, cache effects associated with DMA operations can be constrained to a single memory pool, and CPU accesses to the I/O memory space can be performed using fast cached accesses rather than slow uncached accesses. This yields a reduction in WCET for the application accessing the I/O resource. Also, since cache effects are limited to one memory pool, applications utilizing other memory pools see no impact to their cache state, thus their WCET is unaffected. As a result, platform performance is improved when utilizing an I/O device (for example, an I/O device such as DMA, GPU, or co-processor).

FIG. 1 illustrates a block diagram of an example computing system 100. In the example shown in FIG. 1, the computing system 100 includes at least one central processing unit (CPU) 102, one or more CPU caches 104, a main memory 106, and one or more input/output (I/O) devices 108.

In the example shown in FIG. 1, the computing system includes multiple CPUs 102 that share memory resources (CPU cache 104 and main memory 106). In some examples, the computing system 100 includes a microprocessor chip 101 that includes N CPUs, or cores, which are capable of executing one or more threads in parallel. Each CPU is coupled to at least a CPU cache 104 (for example, level 1 (L1) cache). The CPU cache 104 contains memory and computing logic, and the CPU cache 104 is coupled to main memory 106. In some examples, the main memory 106 can also be coupled to secondary storage (not shown). The CPU cache 104 in the computing system is generally a smaller, faster memory than main memory 106.

It should be understood, however, that the configuration shown in FIG. 1 and other arrangements and processes described herein are set forth for purposes of example only, and other arrangements and elements (e.g., machines, interfaces, functions, orders of elements, etc.) can be added or used instead. Further, as in most computer architectures, those skilled in the art will appreciate that many of the elements described herein are functional entities that may be implemented as discrete components or in conjunction with other components, in any suitable combination and location. For example, the computing system 100 may consist of multiple independent CPU busses so that each CPU can access the CPU cache 104 and other components without contending for a CPU bus with the other CPUs. Furthermore, the computing system 100 may include more than one cache (for example, an L2 and/or L3 cache), which may be either within the microprocessor chip 101 or part of another chip in the computing system 100. Even further, a system may contain multiple independent main memories and secondary storages, not shown in FIG. 1. Each unit of memory in the computing system 100 may comprise semiconductor memory, magnetic memory, optical memory, acoustic memory, biological memory, or any combination of these memory technologies, or any other memory technology used in conjunction with computational devices.

The purpose of the CPU cache 104 in the computing system 100 is to temporarily hold instructions, data, or both, that are being used by tasks executing on one of CPUs 102. As is known to those skilled in the art, patterns of computer memory access exhibit both spatial and temporal locality of reference. That is, once a main memory 106 location is accessed, it is likely that a nearby main memory location will also be accessed, and it is also likely that main memory 106 location will again be accessed soon. Thus, it is advantageous to store data from recently accessed main memory locations and their neighboring locations in a fast-memory cache, such as CPU cache 104, because it is likely that a CPU 102 will once again have to access one of those main memory locations. By storing the data from main memory locations in the CPU cache 104, the system avoids the latency of having to access main memory 106 or any secondary storage to read the data.

While the basic unit of storage in many programming languages is the byte (8 bits), most CPUs 102 use a unit of operation that is several bytes. For example, in a 64-bit microprocessor, memory addresses are typically 64 bits wide. Thus, for main memories that are byte-addressable, a 64-bit microprocessor can address $2^{64}$ (18,446,744,073,709, 551,616) individual bytes (4 exabytes), where those bytes are numbered 0 through 18,446,744,073,709,551,615, for example. Due to spatial locality of reference, most microprocessors cache main memory 106 in groups of bytes called "cache lines." Each cache line is a fixed number of contiguous bytes. For example, a 64-bit microprocessor might have a cache line size of 64 bytes, which means that when a byte from main memory 106 is fetched into the CPU cache, the rest of the cache line is brought into CPU cache 104 as well.

Regardless of the mechanics of memory accesses, the fact that CPU cache 104 is typically much smaller than main memory 106 means that not all main memory locations can be simultaneously resident in CPU cache 104. In order to maintain performance, CPU cache 104 typically will execute a simple operation to map a main memory location to a limited number of CPU cache locations (cache associativity). In some examples, the computing system 100 is configured to avoid cache related interference between applications being executed by the CPUs 102 using similar techniques to those described in the '308 patent. For example, the computing system 100 is configured to store one or more threads of respective applications in main memory locations that map to respective portions of the CPU cache 104.

In the example shown in FIG. 1, the one or more I/O device 108 are communicatively coupled to the main memory 106 and configured to read/write data to/from the main memory 106. In some examples, at least one I/O device 108 is also communicatively coupled to the CPU 102 and/or the CPU cache 104. The one or more I/O devices 108 can be a DMA engine, a GPU, co-processor, or a hardware accelerator utilized by the computing system 100.

Figure 2A:
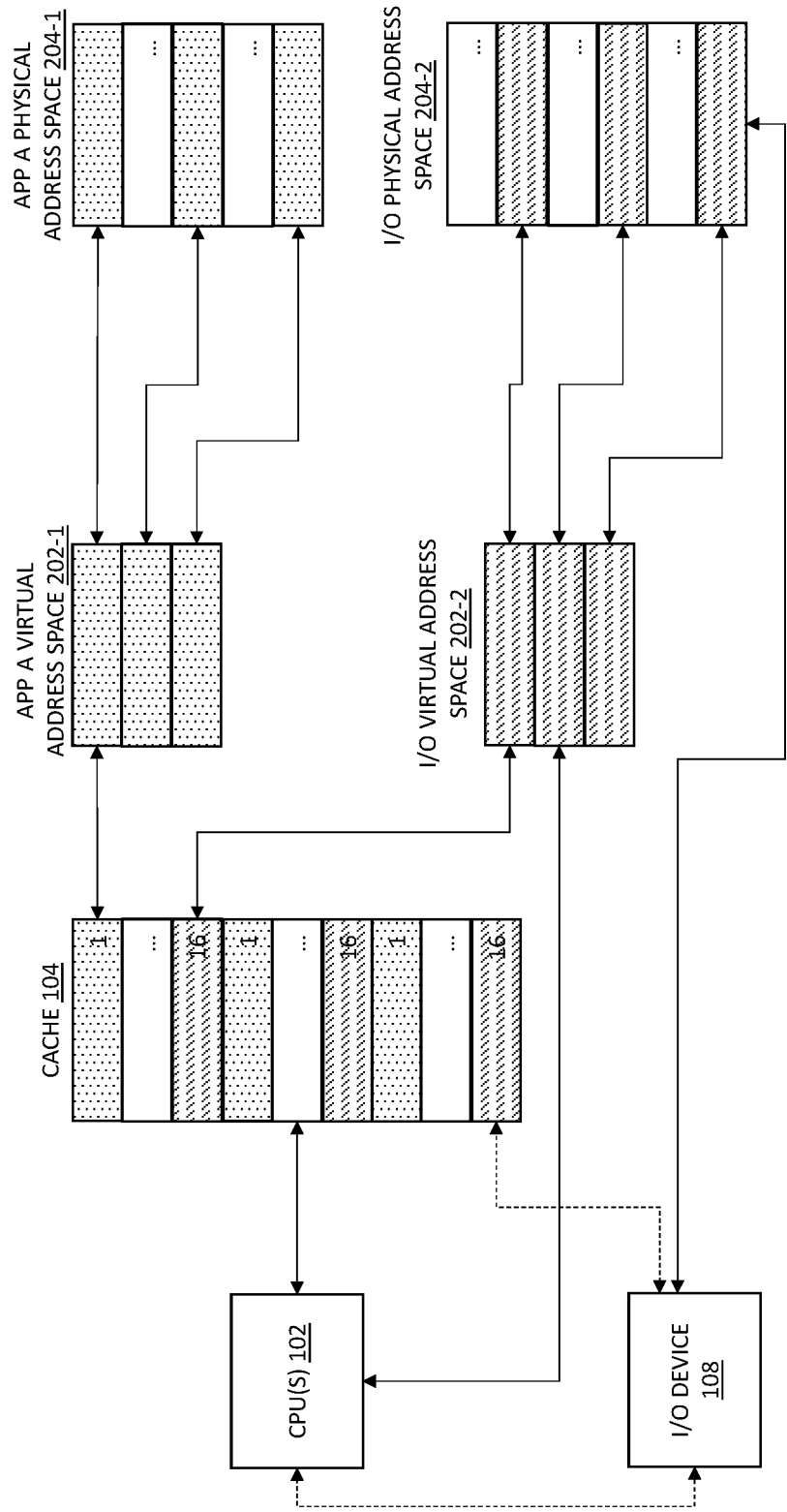
FIGS. 2A-2C are diagrams of example patterns of main memory pools and CPU cache partitions.
Figure 2B:
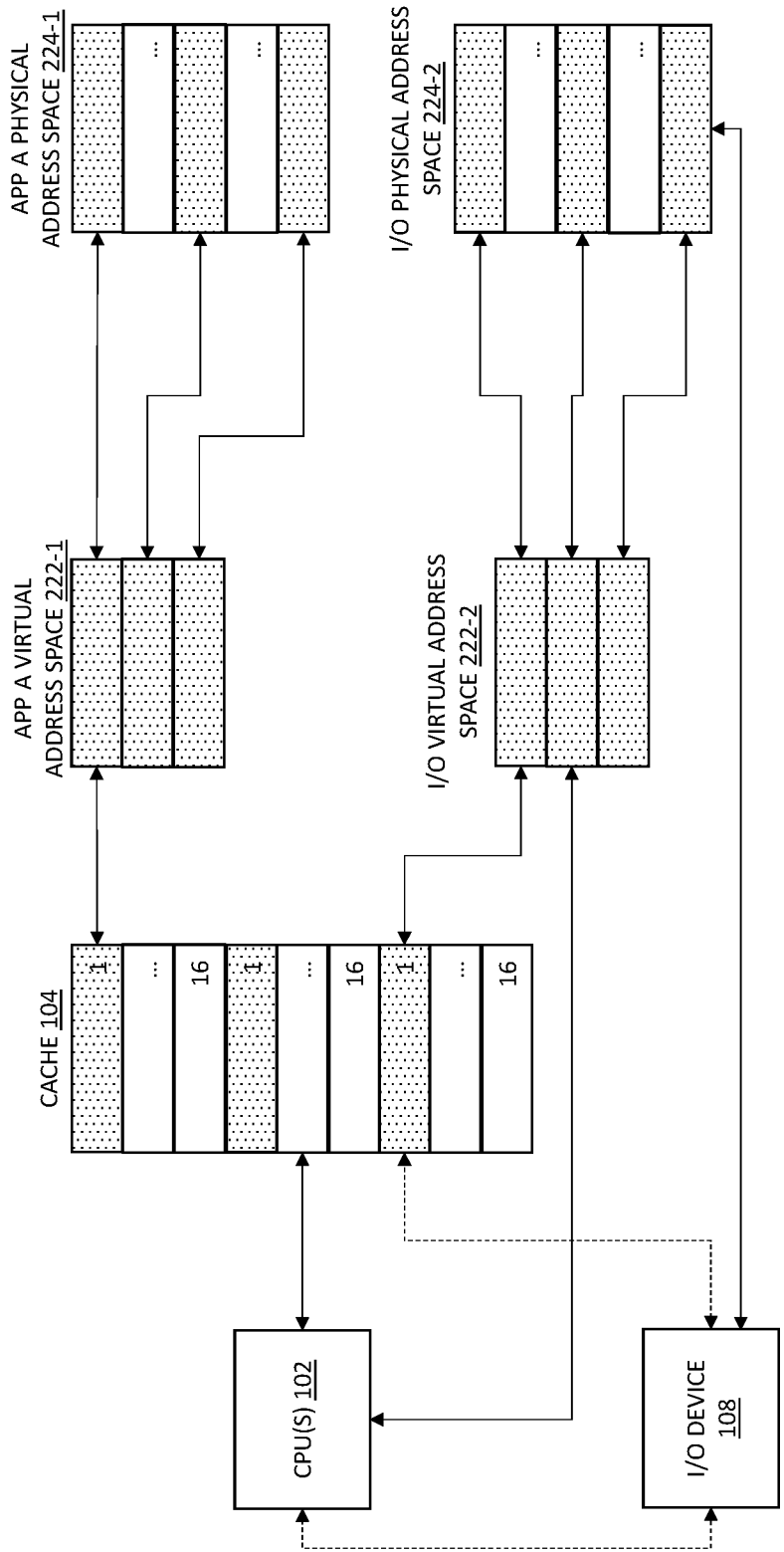
Figure 2C:
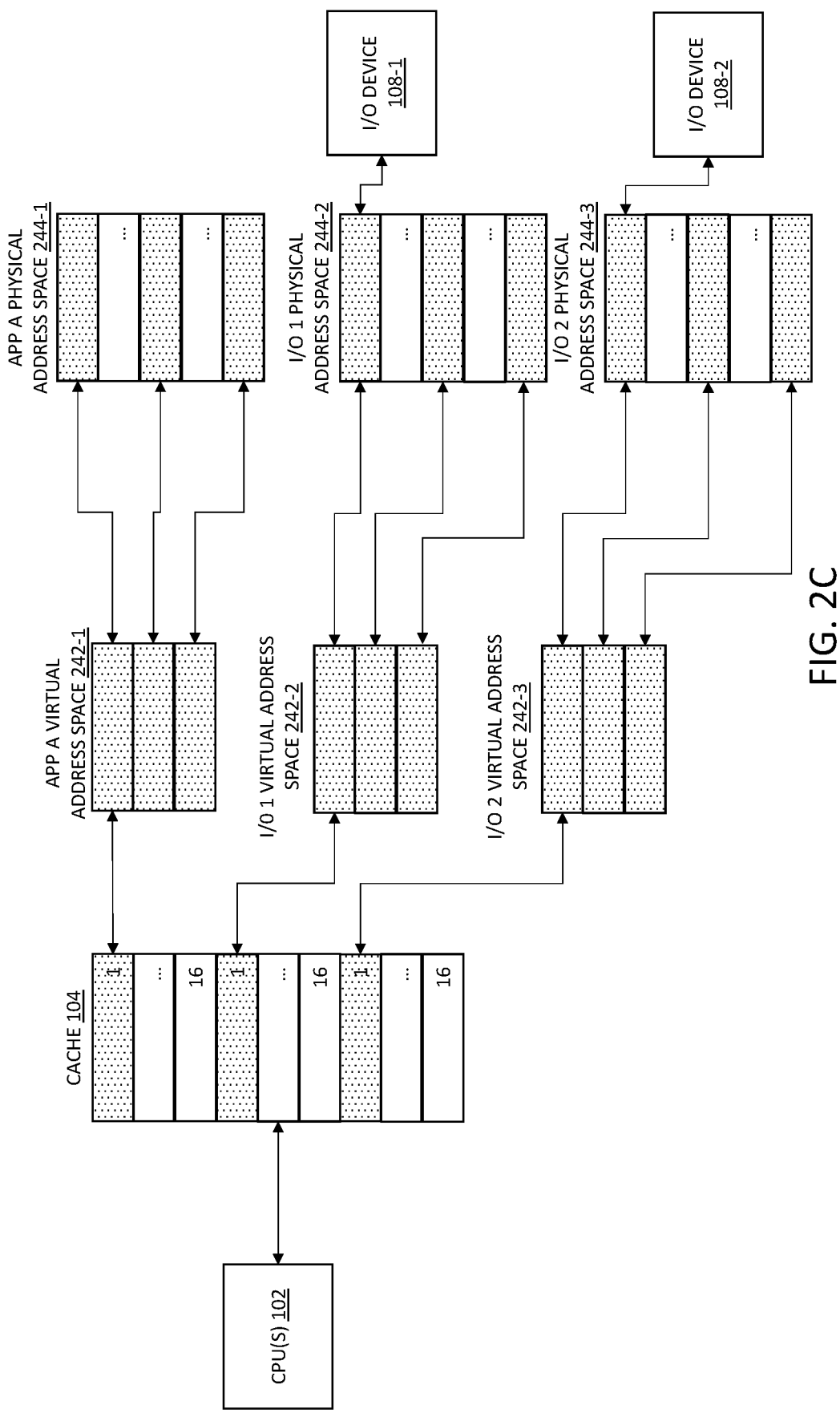

As discussed above, typical approaches for I/O data storage cannot be used when utilizing the memory pools for applications discussed in the '308 patent. The one or more I/O devices 108 of the computing system 100 are configured to store data in the main memory 106 in a manner that does not interfere with the memory pools for the applications that are executed by the CPUs 102. FIGS. 2A-2C illustrate diagrams of example patterns of non-contiguous memory locations of the main memory 106 for different I/O scenarios. It should be understood that some connections between components are omitted from FIG. 2C for ease of illustration, and that the features included in FIGS. 2A-2B could also be included in FIG. 2C.

Typically, an I/O device 108 is configured to directly write/read data to/from the physical memory. In the examples shown in FIGS. 2A-2B, the I/O device 108 is directly communicatively coupled to the main memory locations 204-2, 224-2, and the I/O device 108 is configured to directly write/read I/O data to/from the main memory locations 204-2, 224-2 via the link between the I/O device 108 and the main memory locations 204-2, 224-2.

In some examples, the most recent memory requests are cached prior to be written to the main memory 106. In the examples shown in FIGS. 2A-2B, the I/O device 108 is communicatively coupled to the cache 104, and the I/O device 108 is configured to cache the I/O data via the link between the I/O device 108 and the cache 104. In such examples, the I/O data is included in the cache 104 and only then the cached I/O data is written to the main memory 106.

In some examples, the CPUs 102 are configured to perform uncached memory transfers in certain situations. In the examples shown in FIGS. 2A-2B, the CPUs 102 are communicatively coupled to the virtual address space 202-2, 222-2, and the CPUs 102 are optionally configured to write/read data with uncached memory transfers via the link between the CPUs 102 and the virtual address space 202-2, 222-2.

In the examples shown in FIGS. 2A-2B, the CPUs 102 are communicatively coupled to the I/O device 108. In some examples, the link from the CPUs 102 to the I/O device 108 is used for control and particularly where the CPUs 102 are the master and the I/O device 108 is the slave in the computing systems shown. In some examples, the line from the I/O device 108 to the CPUs 102 is optionally included and can be used for signaling (for example, through interrupts) the CPUs 102 when data transfer is completed by the I/O device.

In the example shown in FIG. 2A, the I/O device 108 is configured to have its own memory pool(s) that is distinct from the memory pools for an application (Application A in FIG. 2A) executed by the CPUs 102. In such examples, the I/O device 108 is configured to store I/O data in a subset of locations 204-2 of the main memory 106 that map to different memory pools of the CPU cache 104 than those that are allocated to one or more threads of the application. The subset of locations where the I/O device 108 stores the I/O data are non-contiguous memory locations 204-2 of the main memory 106 and the locations are separated in address space according to a predefined pattern that is different than the pattern used for storing the one or more threads of the application in non-contiguous memory locations 204-1. In such examples, the non-contiguous memory locations allocated for the I/O data from the I/O device 108 will be included in a separate and distinct memory pool than the memory pool for the application.

In the example shown in FIG. 2B, at least one of the I/O devices 108 is configured to be a private I/O device 108 for a specific application (Application A in FIG. 2B) executed by the CPU(s) 102 and share the cache partition and memory pool with the specific application. In such examples, the I/O device 108 is configured to store I/O data in a subset of locations of the main memory 106 that map to the portions of the CPU cache 104 partitioned for the specific application. The subset of locations 224-2 where the I/O device 108 stores the I/O data are non-contiguous memory locations 224-2 of the main memory 106 and the locations are separated in address space according to a predefined pattern that is the same as the pattern used for storing the one or more threads of the specific application in non-contiguous memory locations 224-1. In such examples, the non-contiguous memory locations allocated for the I/O data from the I/O device 108 will be included in the CPU cache partition for the specific application.

In the example shown in FIG. 2C, two or more of the I/O devices 108-1, 108-2 are configured to be private I/O devices 108 for a specific application (Application A in FIG. 2C) executed by the CPU(s) 102 and share the cache partition and memory pool with the specific application. In such examples, the I/O devices 108-1, 108-2 are configured to store I/O data in respective subsets of locations of the main memory that map to the portions of the CPU cache 104 partitioned for the specific application. The subset of locations 244-2 where the I/O device 108-1 stores the I/O data are non-contiguous memory locations 244-2 of the main memory 106 and the locations are separated in address space according to a predefined pattern that is the same as the pattern used for storing the one or more threads of the specific application in non-contiguous memory locations 244-1. Similarly, the subset of locations where the I/O device 108-2 stores the I/O data are non-contiguous memory locations 244-3 of the main memory 106 and the locations are separated in address space according to a predefined pattern that is the same as the pattern used for storing the one or more threads of the specific application in non-contiguous memory locations 244-1. In such examples, the non-contiguous memory locations allocated for the I/O data from the I/O devices 108-1, 108-2 will be aligned to the memory pool for the specific application.

In some examples, at least one of the I/O devices 108 is configured to be shared by two or more applications executed by the CPU(s) 102. In such examples, the I/O device 108 is configured to store I/O data in a subset of locations of the main memory that map to the portions of the CPU cache 104 partitioned for each respective application. For example, a first subset of locations where the I/O device 108 stores the I/O data are non-contiguous memory locations of the main memory 106 and the locations are separated in address space according to a predefined pattern that is the same as the pattern used for storing the one or more threads of a first application in non-contiguous memory locations, and a second subset of locations where the I/O device 108 stores the I/O data are non-contiguous memory locations of the main memory 106 and the locations are separated in address space according to a predefined pattern that is the same as the pattern used for storing the one or more threads of a second application non-contiguous memory locations. In such examples, the first and second subsets of non-contiguous memory locations allocated for the I/O data from the I/O device 108 will be included in the cache partition for the first and second applications, respectively.

The one or more I/O devices 108 can be configured to operate in different operational modes that enable I/O data to be read from and write to the non-contiguous memory locations of the main memory 106. In some examples, the one or more I/O devices 108 are configured to operate in a linked-list descriptor mode. A linked-list descriptor mode includes reading/writing data to different addresses using pointers that indicate where data is to be read/written next. Rather than starting at a particular address and reading/writing data to contiguous memory locations in a sequential manner, a linked-list descriptor mode enables the I/O device 108 to store I/O data in non-contiguous memory locations of the main memory 106 as defined in the linked-list.

In some examples (such as the linked list descriptor technique described above), the computing system 100 is configured to utilize software-only to enable the one or more I/O devices 108 to respect the memory pools of the one or more applications executed by the CPU(s) 102. In some examples, the CPUs 102 are configured to call an I/O device 108 to perform a data transfer. In the software-only implementations, the predefined non-contiguous memory access pattern utilized by the I/O device 108 can be stored in the main memory 106. In some such examples, the predefined non-contiguous memory access pattern is represented as a linked-list, and the one or more I/O devices 108 are configured to retrieve the linked-list descriptors from the main memory 106 prior to each time the I/O devices 108 input data to the main memory 106 in order to determine where to store the I/O data. In some examples, the descriptor tables in the main memory are precomputed for particular page masks, but the source and destination addresses need to be taken into account or computed.

In some examples, the computing system 100 utilizes specialized hardware and software to enable the I/O devices 108 to respect the memory pools of the one or more applications executed by the CPU(s) 102. Similar to the software-only configuration, the CPUs 102 can be configured to command an I/O device 108 to perform a data transfer. However, in some specialized hardware and software examples, the one or more I/O devices 108 are configured to interact with a memory management unit (MMU) of the computing system 100 in order to access the page table used for the computing system 100 rather than retrieving the non-contiguous memory access pattern (for example, linked-list descriptors) from the main memory 106. For example, the MMU can be configured to partition the CPU cache 104 and main memory 106 for different CPUs 102 and/or CPU cores, and the MMU can be configured to provide information regarding the CPU cache partitions and memory pools to the one or more I/O devices 108. In some examples, the I/O device 108 is configured to query the CPU's MMU or a special purpose I/O MMU and the MMU is configured to return the memory addresses that the I/O device 108 can access for reading/writing I/O data to the main memory 106. In some such examples, the translation lookaside buffer (TLB) of the MMU can include the linked-list descriptors and the I/O device 108 can be provided access to the TLB. In other examples, the I/O device 108 is configured to perform a continuous read/write and the MMU is configured to save the I/O data to the particular non-contiguous locations of the main memory 106. In some examples, the computing system 100 includes an I/O MMU configured to provide I/O address translation for I/O data to/from the I/O device 108.

In other examples of using specialized hardware and software, the I/O device 108 is configured to interact with the microprocessor chip 101 directly via a specialized interface. In some such examples, the I/O device 108 is configured to determine the predefined pattern either from an I/O configuration interface or directly from the processor architecture. In some such examples, the I/O device 108 includes a set of registers that includes the page mask, the source and destination addresses, and bytes to be read/written. In such examples, the I/O device 108 is configured to determine the predefined pattern (for example, using logic, state machines, etc.) based on the information in the set of registers (for example, using the page mask and destination address).

In some examples, the I/O device 108 or other component of the computing system 100 is configured to automatically copy the I/O data that is saved in the non-contiguous memory locations of the main memory 106 to the CPU cache 104. In such examples, the CPU(s) 102 would be enabled to access the I/O data more quickly than if the CPU(s) had to read the data from the main memory 106 into the CPU cache 104.

Figure 3:
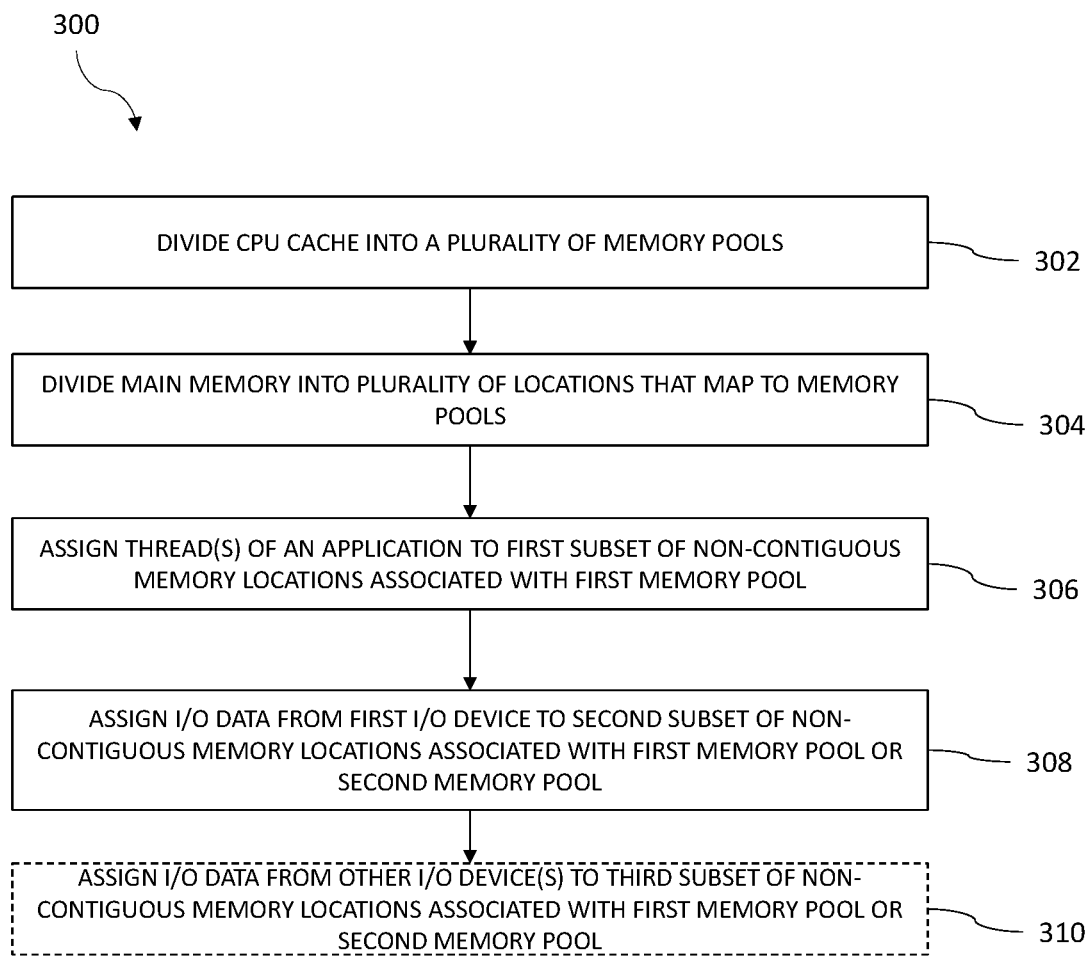
FIG. 3 is a flow diagram of an example method for data input/output for a computing system utilizing memory pools.

FIG. 3 illustrates a flow diagram of an example method 300 for data input/output for a computing system utilizing memory pools. The common features discussed above with respect to computing system 100 with respect to FIGS. 1-2C can include similar characteristics to those discussed with respect to method 300 and vice versa. In some examples, the method 300 is performed using one or more components of the computing system 100.

The method 300 includes dividing the CPU cache into a plurality of memory pools (block 302). In some examples, the CPU cache is divided such that each application executed by the CPUs of a computing system has a respective memory pool assigned to it.

The method 300 further includes dividing the main memory into a plurality of locations that map to the memory pools (block 304) and assigning one or more threads of a first application to a first subset of the plurality of main memory locations associated with a first memory pool (block 306). In some examples, the first subset of the plurality of main memory locations is a non-contiguous set of locations of the main memory that are separated in address space according to a predefined pattern.

The method 300 further includes assigning I/O data from a first I/O device to a second subset of the plurality of main memory locations associated with the first memory pool or a second memory pool (block 308). The I/O device can be, for example, a DMA engine, GPU, co-processor, or hardware accelerator. In some examples, the second subset of the plurality of main memory locations is a non-contiguous set of locations of the main memory that are separated in address space according to a predefined pattern.

In some examples, the first I/O device is exclusively used by the first application. In such examples, the I/O data from the first I/O device is saved in the main memory using a similar pattern to the one or more threads of the first application (for example, as discussed above with respect to FIG. 2B) and associated with the first memory pool. In other examples, the first I/O device is not exclusively used (or used at all) by the first application. In such examples, the I/O data from the first I/O device is saved in the main memory using a wholly different pattern than the pattern used to save the one or more threads of the first application.

In some examples, the first I/O device is shared by multiple applications. In such examples, the I/O data from the first I/O device is saved in the main memory in a similar pattern to that used for saving each of the one or more threads of the multiple applications. For example, a subset of the I/O data saved by the first I/O device is saved in the main memory using a similar pattern used to save the one or more threads of the first application and another subset of the I/O data saved by the first I/O device is saved in the main memory using a similar pattern used to save the one or more threads of the second application.

The method optionally includes assigning I/O data from other I/O device(s) to other subset(s) of the plurality of main memory locations associated with the first memory pool or a second memory pool (block 310). The other I/O device can be the same type as the first I/O device or could also be different. In some examples, the other subset(s) of the plurality of main memory locations are non-contiguous set of locations of the main memory that are separated in address space according to a predefined pattern, which may be the same or different as the patterns used to associate data with the first memory pool or the second memory pool.

The systems and methods described herein provide enable the computing system 100 to use CPU cache partitions and memory pools and also access I/O data as a cached transaction, which is typically many times faster than uncached transactions of the previous systems. The CPUs are more efficient with cached transactions and the WCET when utilizing an I/O device (for example, a DMA, GPU, or co-processor) is greatly reduced. The systems and methods described herein can be utilized in high-performance system to efficiently handle high-throughput network interfaces using multiple DMA engines to send/receive data to a GPU or other co-processor. The systems and methods described herein can also be used to accelerate machine learning applications and aid other I/O intensive applications.

In various aspects, system elements, method steps, or examples described throughout this disclosure (such as the computing, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a computing system, comprising: at least one central processing unit; one or more central processing unit caches; a main memory comprising a plurality of locations, wherein each location of the plurality of locations maps to a set in the one or more central processing unit caches, wherein a first subset of locations of the plurality of locations are partitioned for one or more threads of a first application and assigned to non-contiguous memory locations of the main memory based on a respective set of one or more sets in the one or more central processing unit caches to which each location is mapped; and a first input/output (I/O) device configured to store data in a second subset of locations of the plurality of locations that are different from the first subset of locations partitioned for the one or more threads of the first application, wherein the second subset of locations are non-contiguous memory locations of the main memory that are separated in address space according to a predefined pattern.

Example 2 includes the computing system of Example 1, wherein the first I/O device is a direct memory access (DMA) engine, a graphics processing unit (GPU), or a co-processor, wherein the first I/O device is configured to input data to the main memory and/or output data from the main memory.

Example 3 includes the computing system of any of Examples 1-2, wherein the second subset of locations are mapped to different sets of the one or more central processing unit caches than the first subset of locations.

Example 4 includes the computing system of any of Examples 1-2, wherein the second subset of locations are mapped to the same sets of the one or more central processing unit caches as the first subset of locations.

Example 5 includes the computing system of any of Examples 1-4, further comprising a second I/O device configured to store data in a third subset of locations of the plurality of locations that are distinct from the first subset of locations partitioned for the one or more threads of the first application and the second subset of locations, wherein the third subset of locations are non-contiguous memory locations of the main memory that are separated in address space according to the predefined pattern used for the first subset of non-contiguous memory locations and mapped to the same sets of the one or more central processing unit caches for the first subset of locations.

Example 6 includes the computing system of any of Examples 1-5, further comprising a second I/O device configured to store data in a third subset of locations of the plurality of locations that are distinct from the first subset of locations partitioned for the one or more threads of the first application and the second subset of locations, wherein the third subset of locations are non-contiguous memory locations of the main memory that are separated according to a second predefined pattern and mapped to different sets of the one or more central processing unit caches than the first subset of locations and the second subset of locations.

Example 7 includes the computing system of Example 6, further comprising a third I/O device configured to store data in a fourth subset of locations of the plurality of locations that are distinct from the first subset of locations partitioned for the one or more threads of the first application, the second subset of locations, and the third subset of locations, wherein the fourth subset of locations are non-contiguous memory locations of the main memory that are separated according to a third predefined pattern and mapped to different sets of the one or more central processing unit caches than the first subset of locations, the second subset of locations, and the third subset of locations.

Example 8 includes the computing system of any of Examples 1-7, wherein the predefined pattern is stored in the main memory and represented as a linked-list, wherein the first I/O device is configured to retrieve the linked-list when inputting data to the main memory.

Example 9 includes the computing system of any of Examples 1-8, further comprising a memory management unit, wherein the I/O device is configured to determine the predefined pattern either from an I/O configuration interface or directly from a processor architecture.

Example 10 includes a computing system, comprising: at least one central processing unit; one or more central processing unit caches; a main memory comprising a plurality of locations, wherein each location of the plurality of locations maps to a set in the one or more central processing unit caches, wherein a first subset of locations of the plurality of locations are partitioned for one or more threads of a first application and assigned to non-contiguous memory locations of the main memory based on a respective set of one or more sets in the one or more central processing unit caches to which each location is mapped, wherein a second subset of locations of the plurality of locations are partitioned for one or more threads of a second application and assigned to non-contiguous memory locations of the main memory based on a respective set of one or more sets in the one or more central processing unit caches to which each location is mapped; and a first input/output (I/O) device configured to store data in a third subset of locations of the plurality of locations and a fourth subset of locations of the plurality of locations that are different from the first subset of locations partitioned for the one or more threads of the first application and the second subset of locations partitioned for the one or more threads of the second application, wherein the third subset of locations are non-contiguous memory locations of the main memory that are separated in address space according to a first predefined pattern and mapped to the same sets of the one or more central processing unit caches as the first subset of locations, wherein the fourth subset of locations are non-contiguous memory locations of the main memory that are separated in address space according to a second predefined pattern and mapped to the same sets of the one or more central processing unit caches as the second subset of locations.

Example 11 includes the computing system of Example 10, wherein the first I/O device is a direct memory access (DMA) engine, a graphics processing unit (GPU), or a co-processor, wherein the first I/O device is configured to input data to the main memory and/or output data from the main memory.

Example 12 includes the computing system of any of Examples 10-11, further comprising a second I/O device configured to store data in a fifth subset of locations of the plurality of locations that are distinct from the first subset of locations partitioned for the one or more threads of the first application, the second subset of locations partitioned for the one or more threads of the second application, the third subset of locations and the fourth subset of locations, wherein the fifth subset of locations are non-contiguous memory locations of the main memory that are separated in address space according to the first predefined pattern used for the first subset of non-contiguous memory locations and mapped to the same sets of the one or more central processing unit caches for the first subset of locations.

Example 13 includes the computing system of any of Examples 10-12, further comprising a second I/O device configured to store data in a fifth subset of locations of the plurality of locations that are distinct from the first subset of locations partitioned for the one or more threads of the first application, the second subset of locations partitioned for the one or more threads of the second application, the third subset of locations and the fourth subset of locations, wherein the fifth subset of locations are non-contiguous memory locations of the main memory that are separated according to a third predefined pattern and mapped to different sets of the one or more central processing unit caches than the first subset of locations and the second subset of locations.

Example 14 includes the computing system of any of Examples 10-13, wherein the first predefined pattern for non-contiguous memory access and the second predefined pattern for non-contiguous memory access are stored in the main memory and represented as a linked-list, wherein the first I/O device is configured to retrieve the linked-list when inputting data to the main memory.

Example 15 includes the computing system of any of Examples 10-14, further comprising a memory management unit, wherein the first I/O device is configured to determine the first predefined pattern and the second predefined pattern from an I/O configuration interface with the memory management unit or directly from the at least one central processing unit.

Example 16 includes a computing system, comprising: at least one central processing unit; one or more central processing unit caches; a main memory comprising a plurality of locations, wherein each location of the plurality of locations maps to a set in the one or more central processing unit caches, wherein a first subset of locations of the plurality of locations are partitioned for one or more first threads of a first application and assigned to non-contiguous memory locations of the main memory based on a respective set of one or more sets in the one or more central processing unit caches to which each location is mapped, wherein a second subset of locations of the plurality of locations are partitioned for one or more second threads of the first application and assigned to non-contiguous memory locations of the main memory based on a respective set of one or more sets in the one or more central processing unit caches to which each location is mapped; a first input/output (I/O) device configured to store data in a third subset of locations of the plurality of locations that are different from the first subset of locations partitioned for the one or more first threads of the first application and the second subset of locations partitioned for the one or more second threads of the first application, wherein the second subset of locations are non-contiguous memory locations of the main memory that are separated in address space according to a first predefined pattern and mapped to the same sets of the one or more central processing unit caches as the first subset of locations; and a second input/output (I/O) device configured to store data in a fourth subset of locations of the plurality of locations that are different from the first subset of locations partitioned for the one or more first threads of the first application, the second subset of locations partitioned for the one or more second threads of the first application, and the third subset of locations, wherein the fourth subset of locations are non-contiguous memory locations of the main memory that are separated in address space according to a second predefined pattern and mapped to the same sets of the one or more central processing unit caches as the second subset of locations.

Example 17 includes the computing system of Example 16, wherein the first I/O device is a direct memory access (DMA) engine, a graphics processing unit (GPU), or a co-processor, wherein the first I/O device is configured to input data to the main memory and/or output data from the main memory.

Example 18 includes the computing system of any of Examples 16-17, wherein a fifth subset of locations of the plurality of locations are partitioned for one or more third threads of the first application and assigned to non-contiguous memory locations of the main memory based on a respective set of one or more sets in the one or more central processing unit caches to which each location is mapped, wherein the fifth subset of locations of the plurality of locations map to sets of the one or more central processing unit caches that are different than the first subset of locations and the second subset of locations.

Example 19 includes the computing system of any of Examples 16-18, wherein the first predefined pattern for non-contiguous memory access and the second predefined pattern for non-contiguous memory access are stored in the main memory and represented as a linked-list, wherein the first I/O device is configured to retrieve the linked-list when inputting data to the main memory.

Example 20 includes the computing system of any of Examples 16-19, further comprising a memory management unit, wherein the first I/O device is configured to determine the first predefined pattern from a first I/O configuration interface with the memory management unit or directly from the at least one central processing unit, wherein the second I/O device is configured to determine the second predefined pattern from a second I/O configuration interface with the memory management unit or directly from the at least one central processing unit.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computing system, comprising:
   at least one central processing unit;
   one or more central processing unit caches;
   a main memory comprising a plurality of locations, wherein each location of the plurality of locations maps to a set in the one or more central processing unit caches, wherein a first subset of locations of the plurality of locations are partitioned for one or more threads of a first application and assigned to non-contiguous memory locations of the main memory based on a respective set of one or more sets in the one or more central processing unit caches to which each location is mapped; and
   a first input/output (I/O) device separate from the at least one central processing unit, wherein the first I/O device is configured to store data in a second subset of locations of the plurality of locations that are different from the first subset of locations partitioned for the one or more threads of the first application, wherein the second subset of locations are non-contiguous memory locations of the main memory that are separated in address space according to a predefined pattern;
   wherein the first I/O device is configured to determine the predefined pattern based on commands received from the at least one central processing unit, a linked-list that includes pointers indicating where data is to be written next, information from a memory management unit, or information in a set of registers of the first I/O device.

2. The computing system of claim 1, wherein the first I/O device is a direct memory access (DMA) engine, a graphics processing unit (GPU), or a co-processor, wherein the first I/O device is configured to input data to the main memory and/or output data from the main memory.

3. The computing system of claim 1, further comprising a second I/O device separate from the first I/O device and the at least one central processing unit, wherein the second I/O device is configured to store data in a third subset of locations of the plurality of locations that are distinct from the first subset of locations partitioned for the one or more threads of the first application and the second subset of locations, wherein the third subset of locations are non-contiguous memory locations of the main memory that are separated in address space according to the predefined pattern or according to a second predefined pattern.

4. The computing system of claim 1, wherein the predefined pattern is stored in the main memory and represented as a linked-list, wherein the first I/O device is configured to retrieve the linked-list when inputting data to the main memory.

5. The computing system of claim 1, further comprising a memory management unit, wherein the I/O device is configured to determine the predefined pattern either from an I/O configuration interface or directly from a processor architecture.

6. A computing system, comprising:
   at least one central processing unit;
   one or more central processing unit caches;
   a main memory comprising a plurality of locations, wherein each location of the plurality of locations maps to a set in the one or more central processing unit caches, wherein a first subset of locations of the plurality of locations are partitioned for one or more threads of a first application and assigned to non-contiguous memory locations of the main memory based on a respective set of one or more sets in the one or more central processing unit caches to which each location is mapped; and
   a first input/output (I/O) device separate from the at least one central processing unit, wherein the first I/O device is configured to store data in a second subset of locations of the plurality of locations that is and a fourth subset of locations of the plurality of locations that are different from the first subset of locations partitioned for the one or more threads of the first application, wherein the second subset of locations are non-contiguous memory locations of the main memory that are separated in address space according to a first predefined pattern and mapped to the same sets of the one or more central processing unit caches as the first subset of locations;
   wherein the first I/O device is configured to determine the first predefined pattern based on commands received from the at least one central processing unit, a linked-list that includes pointers indicating where data is to be written next, information from a memory management unit, or information in a set of registers of the first I/O device.

7. The computing system of claim 6, wherein the first I/O device is a direct memory access (DMA) engine, a graphics processing unit (GPU), or a co-processor, wherein the first I/O device is configured to input data to the main memory and/or output data from the main memory.

8. The computing system of claim 6, further comprising a second I/O device separate from the first I/O device and the at least one central processing unit, wherein the second I/O device is configured to store data in a third subset of locations of the plurality of locations that are distinct from the first subset of locations partitioned for the one or more threads of the first application and the second subset of locations, wherein the third subset of locations are non-contiguous memory locations of the main memory that are separated in address space according to the first predefined pattern used for the first subset of non-contiguous memory locations and mapped to the same sets of the one or more central processing unit caches for the first subset of locations or according to a second predefined pattern and mapped to different sets of the one or more central processing unit caches than the first subset of locations and the second subset of locations.

9. The computing system of claim 6, wherein the first predefined pattern for non-contiguous memory access and the second predefined pattern for non-contiguous memory access are stored in the main memory and represented as a linked-list, wherein the first I/O device is configured to retrieve the linked-list when inputting data to the main memory.

10. The computing system of claim 6, further comprising a memory management unit, wherein the first I/O device is configured to determine the first predefined pattern and the second predefined pattern from an I/O configuration interface with the memory management unit or directly from the at least one central processing unit.

11. A computing system, comprising:
at least one central processing unit;
one or more central processing unit caches;
a main memory comprising a plurality of locations, wherein each location of the plurality of locations maps to a set in the one or more central processing unit caches, wherein a first subset of locations of the plurality of locations are partitioned for one or more first threads of a first application and assigned to non-contiguous memory locations of the main memory based on a respective set of one or more sets in the one or more central processing unit caches to which each location is mapped, wherein a second subset of locations of the plurality of locations are partitioned for one or more second threads of the first application and assigned to non-contiguous memory locations of the main memory based on a respective set of one or more sets in the one or more central processing unit caches to which each location is mapped;
a first input/output (I/O) device separate from the at least one central processing unit, wherein the first I/O device is configured to store data in a third subset of locations of the plurality of locations that are different from the first subset of locations partitioned for the one or more first threads of the first application and the second subset of locations partitioned for the one or more second threads of the first application, wherein the second subset of locations are non-contiguous memory locations of the main memory that are separated in address space according to a first predefined pattern; and
a second input/output (I/O) device separate from the first I/O device and the at least one central processing unit, wherein the second I/O device is configured to store data in a fourth subset of locations of the plurality of locations that are different from the first subset of locations partitioned for the one or more first threads of the first application, the second subset of locations partitioned for the one or more second threads of the first application, and the third subset of locations, wherein the fourth subset of locations are non-contiguous memory locations of the main memory that are separated in address space according to a second predefined pattern;
wherein the first I/O device is configured to determine the first predefined pattern based on commands received from the at least one central processing unit, a linked-list that includes pointers indicating where data is to be written next, information from a memory management unit, or information in a set of registers of the first I/O device;
wherein the second I/O device is configured to determine the second predefined pattern based on commands received from the at least one central processing unit, a linked-list that includes pointers indicating where data is to be written next, information from a memory management unit, or information in a set of registers of the second I/O device.

12. The computing system of claim 11, wherein the first I/O device is a direct memory access (DMA) engine, a graphics processing unit (GPU), or a co-processor, wherein the first I/O device is configured to input data to the main memory and/or output data from the main memory.

13. The computing system of claim 11, wherein the first predefined pattern for non-contiguous memory access and the second predefined pattern for non-contiguous memory access are stored in the main memory and represented as a linked-list, wherein the first I/O device is configured to retrieve the linked-list when inputting data to the main memory.

14. The computing system of claim 11, further comprising a memory management unit, wherein the first I/O device is configured to determine the first predefined pattern from a first I/O configuration interface with the memory management unit or directly from the at least one central processing unit, wherein the second I/O device is configured to determine the second predefined pattern from a second I/O configuration interface with the memory management unit or directly from the at least one central processing unit.

15. The computing system of claim 11, wherein the first I/O device is communicatively coupled to the at least one central processing unit via a first communication link, wherein the first I/O device is configured to receive one or more commands from the at least one central processing unit via the first communication link; and/or
wherein the second I/O device is communicatively coupled to the at least one central processing unit via a second communication link, wherein the second I/O device is configured to receive one or more commands from the at least one central processing unit via the second communication link.

16. The computing system of claim 11, wherein the first I/O device is configured to determine the first predefined pattern based on information in a set of registers of the first I/O device; and/or
wherein the second I/O device is configured to determine the second predefined pattern based on information in a set of registers of the second I/O device.

17. The computing system of claim 1, wherein the first I/O device is communicatively coupled to the at least one central processing unit via a first communication link, wherein the first I/O device is configured to receive one or more commands from the at least one central processing unit via the first communication link.

18. The computing system of claim 1, wherein the first I/O device is configured to determine the predefined pattern based on information in a set of registers of the first I/O device.

19. The computing system of claim 6, wherein the first I/O device is communicatively coupled to the at least one central processing unit via a first communication link, wherein the first I/O device is configured to receive one or more commands from the at least one central processing unit via the first communication link.

20. The computing system of claim 6, wherein the first I/O device is configured to determine the predefined pattern based on information in a set of registers of the first I/O device.

\* \* \* \* \*

UNITED STATES PATENT AND TRADEMARK OFFICE
CERTIFICATE OF CORRECTION

| | |
|---|---|
| PATENT NO. | : 11,847,074 B2 |
| APPLICATION NO. | : 17/087221 |
| DATED | : December 19, 2023 |
| INVENTOR(S) | : Zaykov et al. |

It is certified that error appears in the above-identified patent and that said Letters Patent is hereby corrected as shown below:

In the Claims

At Claim 6, Column 14, Lines 40-41, please delete "and a fourth subset of locations of the plurality of locations that are" between "that is" and "different from".

Signed and Sealed this
Twenty-eighth Day of May, 2024

*Katherine Kelly Vidal*

Katherine Kelly Vidal
*Director of the United States Patent and Trademark Office*